Patented Aug. 18, 1931

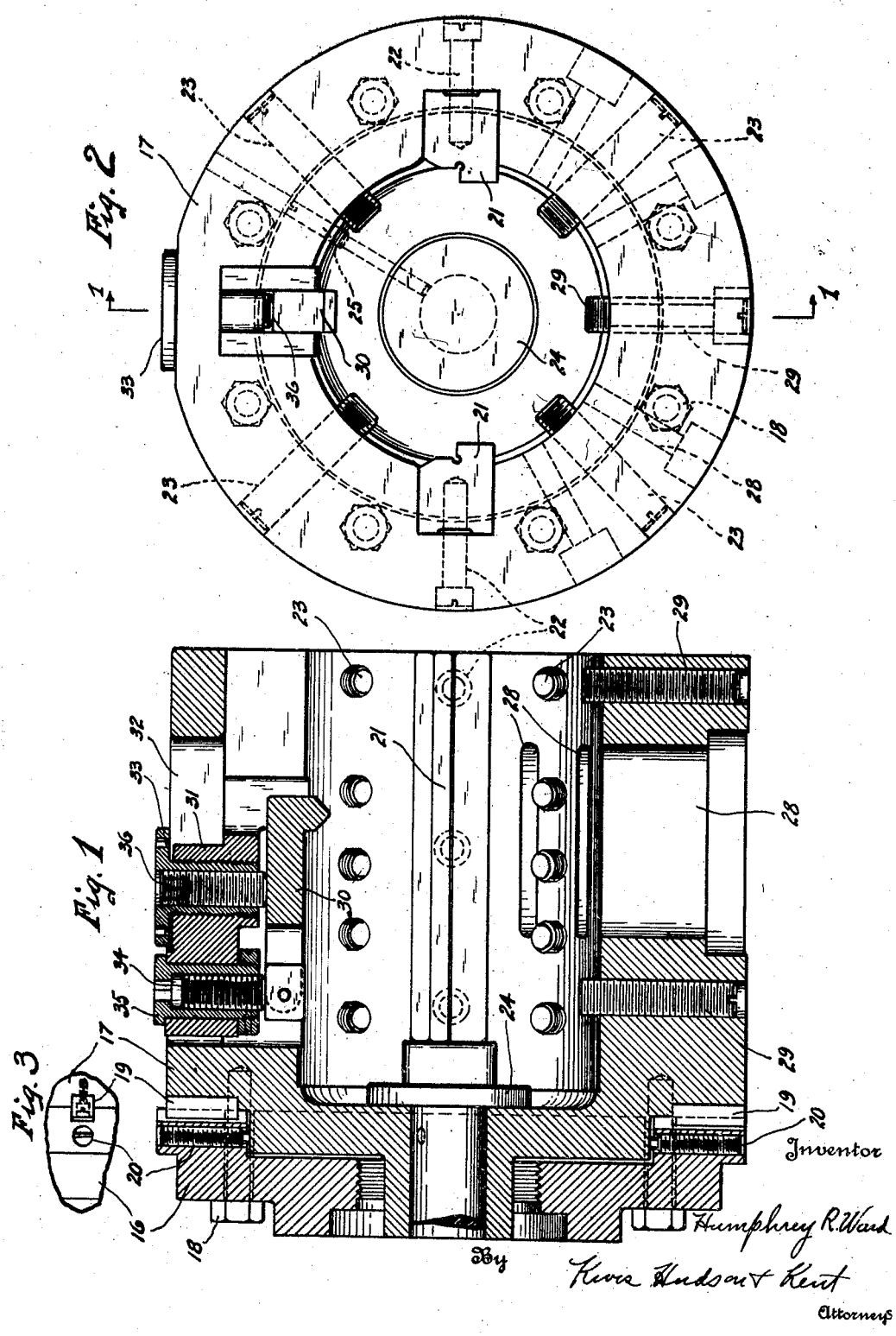

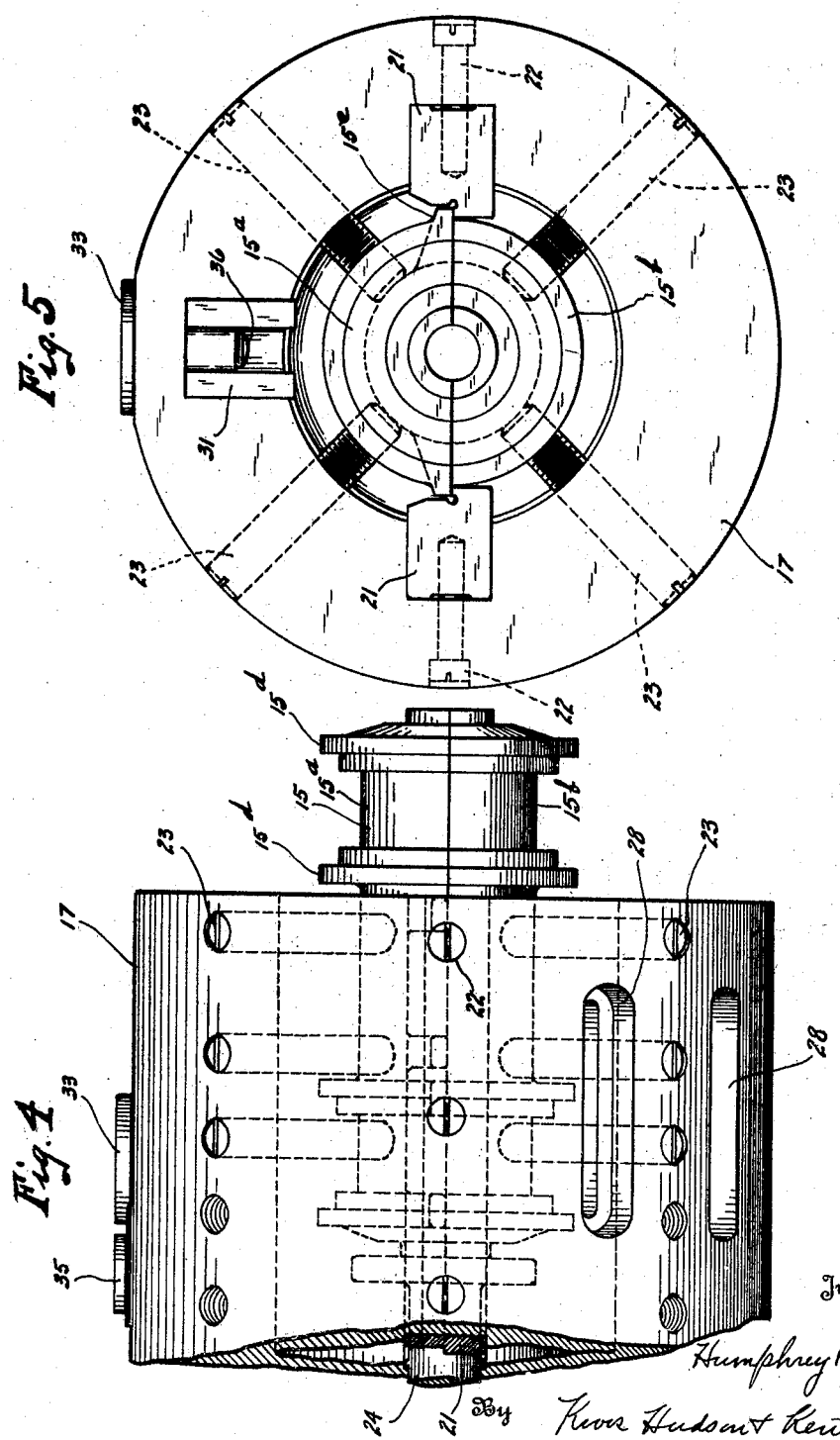

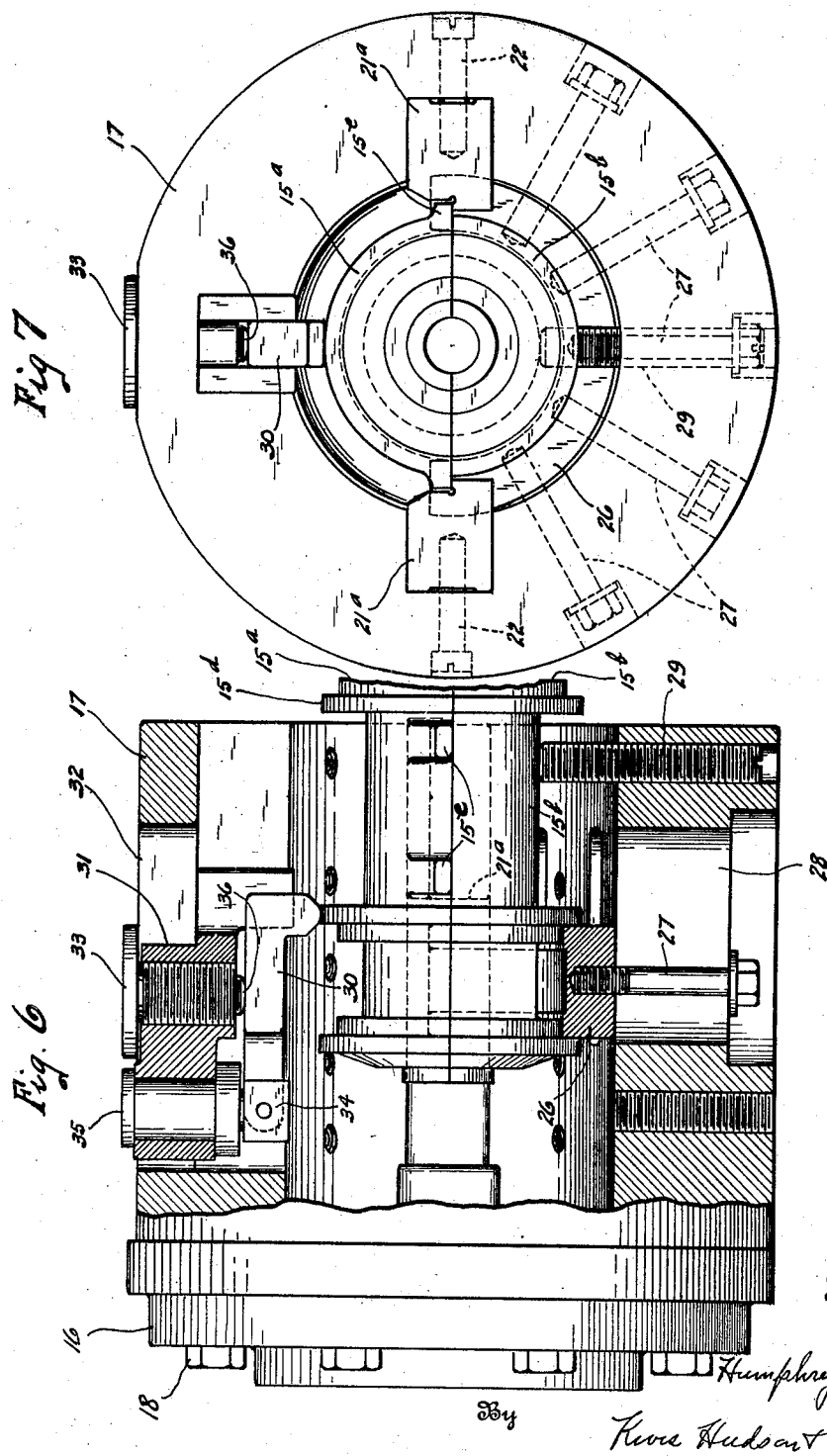

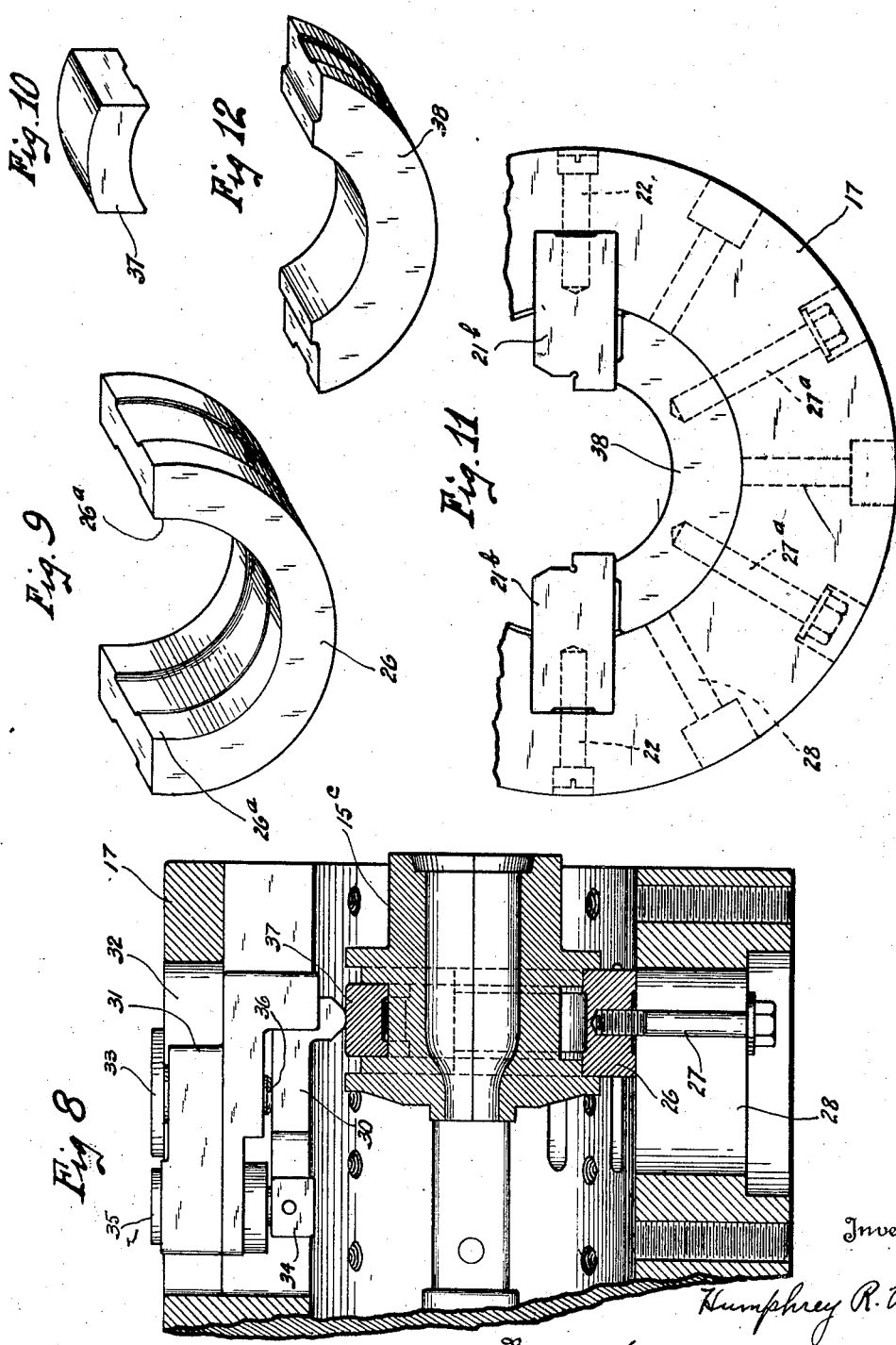

1,819,802

UNITED STATES PATENT OFFICE

HUMPHREY E. WARD, OF BOSTON, MASSACHUSETTS, ASSIGNOR TO THE WARNER & SWASEY COMPANY, OF CLEVELAND, OHIO, A CORPORATION OF OHIO

CHUCK

Application filed December 2, 1927. Serial No. 237,136.

This invention relates to chucks for machine tools and has for its chief object to provide a novel construction adapted for holding or gripping work pieces differing widely in length, diameter, and in contour.

A further object is to provide a chuck having locating, holding and clamping devices which are capable of a wide range of adjustment for varying diameters and lengths of work pieces.

More particularly it is the aim of the invention to provide a chuck adapted for gripping work pieces each formed in two halves as well as of irregular shape or contour, this chuck being particularly adapted for use in machining bottle molds. In this connection it is one of the important objects to provide a chuck capable of supporting work pieces such as bottle molds formed in two halves and formed in double lengths in the sense that they are adapted to be cut into two sections to form two separate molds, my improved chuck when employed for this purpose being designed to support the two halves of the double or twin section so that first one end and then the other may be machined, and then after the double or twin mold has been cut in two, to support a single mold member formed in two halves, to permit the necessary internal boring.

The above and other objects are attained by my invention which may be here briefly summarized as consisting in certain novel combinations and arrangements of parts which will be described in the specification and set forth in the appended claims.

In the accompanying sheets of drawings wherein I have shown the preferred embodiment of the invention, Fig. 1 is a central longitudinal sectional view of the chuck, the view being taken substantially along the line 1—1 of Fig. 2; Fig. 2 is an end view looking toward the left of Fig. 1; Fig. 3 is a detail view of certain portions shown in Fig. 1; Fig. 4 is an elevation of a portion of a chuck showing a double bottle mold supported therein for the first operation to be performed thereon; Fig. 5 is an end view of the same looking toward the left of Fig. 4; Fig. 6 is a view similar to Fig. 1 showing the work piece reversed so as to perform the second main operation thereon with the work piece gripped on that part which was machined in the operation performed when the work piece is held as in Fig. 4; Fig. 7 is an end view looking toward the left of Fig. 6; Fig. 8 is a view similar to Fig. 1 showing how the work piece is held in the chuck after it has been cut in two for the internal boring operation of the two halves of the single mold; Figs. 9 and 10 are perspective views of work supporting parts illustrated in Fig. 8; Fig. 11 is an end view of a portion of the chuck showing different works supporting members mounted therein than illustrated in the preceding views to illustrate the flexibility or range of use of the chuck in its adaptation for work pieces of different sizes; and Fig. 12 is a perspective view of a supporting member illustrated in Fig. 11.

As previously stated, this chuck is well adapted for use in machining bottle molds though I wish it to be understood that it may be employed for supporting other kinds of work pieces, particularly when they consist of two halves which are adapted to be supported and clamped together in centralized relation while undergoing the machining operations. Although the present chuck was designed primarily for use in machining bottle molds and although I have illustrated my invention in connection with this one of many forms of bottle molds, it is to be understood that my invention is not to be confined to this particular kind of work piece.

The bottle mold illustrated is shown at 15, this mold being preferably formed not only in two halves which I have designated 15ª and 15ᵇ having meeting faces which engage each other along the center plane of the mold but the mold is produced in twin form to facilitate the machining and is adapted to be cut in two, midway between its ends to form two separate molds, one of which is shown in Fig. 8 and is designated 15ᶜ. As shown in several figures of the drawings, the mold 15 is provided with radially disposed flanges 15ᵈ which not only are essential in the subsequent use of the mold after it is completed but are utilized with my present construction in supporting the mold in the chuck. Another feature embodied in the mold when first cast is oppositely disposed laterally projecting ears 15ᵉ which are formed on one of the halves, in this instance the half designated 15ᵃ, these ears being utilized with my present chuck construction in supporting the mold in the chuck and being in one of the final operations machined off. These ears are mentioned for the reason that they cooperate with certain important elements of the chuck in supporting the mold while it is being machined.

As illustrated in Figs. 1 and 6, the chuck includes an adapter 16 which is adapted to be screwed onto the work spindle of a lathe or other machine tool. To the front face of this adapter is secured a hollow rotary member or chuck body 17 carrying all the parts utilized in supporting the work piece. This member is secured to the adapter by axially disposed screws 18 but it is adjustably secured thereto so that certain work supporting surfaces, consisting in this instance of shoulders or work supporting rails, may be exactly centralized with respect to the axis of the spindle. To bring about this adjustment for the purpose stated, the rear portion of the chuck body 17 is provided with two oppositely disposed radial keys 19 which are slidingly engaged in slots on the front face of the outer portion of the adapter 16, as illustrated in Figs. 1 and 3. The necessary adjustment is accomplished by a pair of oppositely disposed set screws 20 which extend through the outer part of the adapter adjacent the keys 19 and in the same plane therewith and at their inner ends engage a shoulder at the rear part of the chuck body. The holes in the adapter through which the securing screws 18 pass are somewhat larger than the diameter of the screws so that this relative adjustment between the chuck body and adapter may take place Very important work supporting elements of the chuck are two rails 21 which extend longitudinally or axially of the chuck body which rails are diametrically opposite each other, as clearly illustrated, for example, in Fig. 2, and are secured in two parallel grooves on the inner bore of the chuck body with their inner ends projecting into the bore. These rails may project inwardly from the outer or free end of the chuck body lengthwise of the bore to substantially its rear end, as illustrated in Fig. 1, or shorter rails may be employed, particularly in certain operations or for work pieces of certain lengths, as illustrated, for example, in Fig. 6, wherein the rails are designated 21ᵃ. Furthermore, the inner ends of the rails may project inwardly only a short distance beyond the inner wall of the chuck body, as illustrated in Fig. 2, when work pieces of relatively large diameters are being machined. When work pieces of smaller diameters are being machined, rails may be employed which project a greater distance into the interior of the chuck body, as illustrated at 21ᵇ in Fig. 11.

As previously stated, the rails are secured in axially or longitudinally disposed grooves of the chuck body and they are preferably removably secured in place by screws 22 which extend through the chuck body and have threaded engagement with the rails. The rails 21 are utilized in supporting one half of the work piece by the engagement therewith of projecting portions thereof, these projecting portions in this instance being the ears 15ᵉ already referred to and described as being provided for supporting purposes on the half 15ᵃ of the bottle mold. For the purpose of clamping said half of the mold onto the rails 21, the chuck is provided with two rows of radially disposed screws 23 the inner ends of which are adapted to engage the half of the mold at spaced points located on opposite sides of the midplane thereof, as clearly illustrated in Figs. 2 and 5, and particularly in the latter which shows the work piece in place. These screws 23 are, of course, adjustable so that they not only serve to clamp the half of the mold onto the rails but make it possible to adjust the work piece so that it will be exactly centralized on the rails with respect to the axis of rotation. After the half of the mold just referred to is centralized and clamped to the rails, the other half of the mold 15ᵇ is centralized and clamped to the face of the first half 15ᵃ by means of additional centralizing and clamping screws 23 similar in function and arrangement to the screws used in centralizing and clamping the first mentioned half 15ᵃ to the rails.

The two halves of the mold are now properly supported in the chuck in the manner illustrated in Figs. 4 and 5 ready for the first machining operation, this being the facing and turning operation performed particularly on the flanges 15ᵈ on that part of the mold which projects outwardly beyond the chuck, as illustrated in Fig. 4. When the mold is positioned in the chuck, as explained above, the inner end thereof is preferably brought into engagement with a stop 24 having a shank which is slidably mounted in a sleeve-like rear or inner portion of the chuck body 17 which portion is adapted to freely enter the spindle. The stop 24 may be adjusted in and out and secured in position by any convenient manner, as by means of a screw 25 shown by dotted lines in Fig. 2.

After the first machining operations on the outwardly projecting portions of the mold have been performed, the mold is reversed in position and again inserted in the chuck and held in position in the manner indicated in Figs. 6 and 7 with the opposite end of the mold projecting beyond the chuck so that this part may now be machined in the same manner as in the first facing and turning operation on the end which previously projected from the chuck. In supporting and centralizing the mold for this second operation with the mold reversed, some of the elements employed in first supporting and centralizing the mold are utilized, but the mold is now preferably centralized and positioned axially or longitudinally of the chuck body by other instrumentalities engaging the now machined part of the mold. These instrumentalities include an arc-shaped centralizing member in the form of a substantially half-ring 26 forming the equivalent of a cradle into which the machined portion of the half 15$^b$ of the mold engages. This member or cradle 26 is secured to the wall forming the inner bore of the chuck body by means of a series of radially disposed screws 27 which are spaced apart circumferentially of the chuck body so as to engage different circumferentially spaced points of the cradle, as illustrated in Figs. 6 and 7. To enable the cradle to be adjusted inwardly and outwardly axially of the chuck body, the chuck body is provided on about one-half thereof with a series of radial, longitudinally elongated slots 28 through which the screws 27 extend and along which they may be adjusted. As will be observed from Fig. 6, the action of the screws 27 is to pull the cradle toward the annular bore of the chuck body.

After the inner part of the part of the half 15$^b$ of the mold has been centralized on the cradle 26, this half of the mold is then further supported to take care of the overhang by means of a screw 29 which extends radially inward through the chuck body at a point midway between the rails already referred to. It will be understood that by means of the cradle 26 and the screw 29 the half 15$^b$ of the mold is centralized and supported.

Next, the half 15$^a$ of the mold is placed in position with its flat face in engagement with the corresponding face of the half 15$^b$. In centralizing this half of the mold, the ends 26$^a$ of the cradle are utilized, these ends projecting slightly beyond the center plane of the chuck body and having their inner faces parallel, forming two accurate, parallel surfaces between which the half 15$^a$ of the mold is inserted, it being understood that the sides of the cradle, by being engaged by the flanges of the half 15$^a$ of the mold, serve to locate the half 15$^a$ of the mold as far as its position axially of the chuck is concerned. On account of the overhang between the cradle 26 and the parts which project beyond the chuck to be machined, not only is the centrally disposed screw 29 employed to support the mold but also the ears 15$^c$ of the half 15$^a$ of the mold are caused to engage the supporting rails which are preferably shorter than the supporting rails used for the first machining operation, these being the shorter rails 21$^a$ previously referred to.

The two halves of the mold now being centralized as explained above and supported with their faces in engagement with each other, there is now utilized a clamping member which engages the half 15$^a$ of the mold, in this instance on one of the flanges thereof, and clamps the two halves of the mold together and into engagement with their respective supporting elements. This clamping member is in the form of a longitudinally extending pivoted lever 30 which normally lies in a substantially axial position, the forward end being the work clamping part and the rear end being pivoted. This clamping lever 30 is supported in an adjustable slide 31 adapted to be moved longitudinally in a slot 32 in the chuck body and to be secured therein in any adjusted position by means of a screw bushing 33 which has threaded engagement with the slide and is adapted to pull a shoulder formed on the inner part thereof against a shoulder formed on the chuck body (see Fig. 1) when a flange of the bushing is caused to engage an outer flattened part of the chuck body (note Figs. 1 and 2), thus causing a clamping action between the slide and the shoulder of the chuck body. The clamping lever 30 is mounted so it can be adjusted as a whole radially in and out and this is preferably done by pivoting the inner end of the lever to the head of a screw 34 which has threaded engagement with a bushing 35 which is carried by the slide 31 and may be turned from the outer side of the chuck body by means of a suitable wrench to move the screw in or out and thus adjust the clamping lever.

Assuming that the pivoted end of the clamping lever has been properly positioned as far as radial adjustment is concerned, and that the slide has been properly positioned longitudinally of the chuck body so as to cause the nose of the lever to properly engage the half 15$^a$ of the mold, the lever is moved and held in tight clamping engagement with the work by means of a screw 36 which extends through and has threaded engagement with the interior of the screw bushing 33. This screw is preferably provided with a socket identical with the socket formed in the bushing 35 so that the same wrench may be utilized to turn the bushing so as to adjust the clamping lever radially and to manipulate the screw 36.

The work piece is now centralized and securely held in the chuck and the second facing and turning operation is now performed on the part which projects therefrom, this being a duplicate of the first operation.

Then the double mold is cut in two, making two single molds 15$^e$ one shown in Fig.

8. This single mold is now supported in the chuck to be bored internally and to be suitably machined at its ends. In supporting the single mold, I prefer to employ the half-circular supporting member or cradle 26 previously described but generally differently positioned in the chuck than when employed for the second machining operation as illustrated in Fig. 6. One-half of the mold is, of course, supported in the supporting cradle 26 and the other half is fitted into engagement therewith between the projecting ends 26ª of the supporting cradle, and the parts are preferably held in clamped engagement by the pivoted clamping lever 30, there being employed at times, depending upon the shape or design of the exterior portion of the mold, a clamping block 37 shown in detail in Fig. 10 and in operation in Fig. 8, this block as shown in the last mentioned figure being fitted between faced flanges of the half of the mold directly opposite the supporting cradle 26, the nose of the clamping lever engaging this block generally at the center thereof. The use of the intermediate clamping block 37 between the clamping lever and the mold is not necessary in all instances, the chief object in its use lying in the fact that it is unnecessary to manipulate the clamping screw 36 to any great extent, but on the other hand, a few turns of the screw will be sufficient to move the clamping lever to clamping position.

In the use of the supporting cradle 26 and of the clamping lever 30 in supporting the mold in various stages of its completion, it is desirable to adjust the cradle 26 and the clamping lever lengthwise of the chuck body, as will be apparent by a comparison of Figs. 6 and 8. This will make clear the utility of the elongated slots 28 through which the screws 27 pass and of the slot 32 which receives the slide 31 carrying the lever 30.

It has been previously stated that the rails which support work peices of relatively large diameters may project only a short distance beyond the inner annular wall of the chuck body, as illustrated in Fig. 7, and for supporting work pieces of relatively small diameters the inner ends of the rails may be required to project a considerable distance beyond the inner annular wall of the chuck. In the latter case it may be desirable to support the inner overhanging portions of the rails to give rigidity thereto and this is preferably done by an arc-shaped rail supporting member 38 which at its free ends is adapted to engage the sides of the overhanging portions of the rails opposite that to which the pressure is applied in clamping one-half of the mold onto the rails. This rail supporting member which is formed at its ends so as to engage near the inner ends of the rails is clamped to the inner annular wall of the chuck body by screws 27ª which may be similar to and in fact the same screws which, as illustrated in Figs. 6 and 8 are utilized to secure the cradle 26 to the chuck body, and which extend through the elongated slots 28.

It will be understood that the arc-shaped rail supporting member 38 may be of any width, and if the rails to be supported are very long, a number of said supporting members may be used. At this point it might be mentioned that with certain work pieces it may be desirable to employ a plurality of the cradles 26, in which event the rail supporting members 38, if more than one is employed, will be so placed that they will not interfere with the cradles 26.

It will be seen from the above that I have provided a chuck having great utility and which is especially adapted for machining complete irregular articles of various diameters and lengths, and articles consisting of two halves, such as bottle molds, the machining of which has heretofore presented a serious problem and has required various forms of chucks each designed substantially for one machining operation.

While I have shown the preferred construction, including various supporting elements which give the chuck a wide range of use in supporting a work piece at various stages of its completion and in its different positions, I do not desire to be confined to the precise arrangement or details shown but aim in my claims to cover all modifications which do not involve a departure from the spirit and scope of my invention.

Having thus described my invention, I claim:

1. A chuck comprising a rotary member having a pair of longitudinally extending work supporting shoulders projecting inwardly into the interior of the rotary member and overhanging the inner wall thereof, and means for supporting the inwardly overhanging portions of the shoulders.

2. A chuck comprising a hollow rotary member having a pair of work supporting shoulders projecting inwardly into the interior and overhanging the inner wall thereof, and means for supporting the inwardly overhanging portions of the shoulders comprising a member secured on the interior of the rotary member in supporting engagement with the shoulders.

3. In a chuck, a hollow rotary member having an inner cylindrical bore, means for supporting a two-part work piece therein comprising an arc-shaped member secured to the inner wall of the rotary member and adjustable lengthwise thereof for engaging and supporting one-half of a work piece, and means for engaging the other half of the work piece and for holding it in engagement with the first mentioned half.

4. In a chuck, a hollow rotary member having an inner cylindrical bore, means for supporting a work piece therein comprising an arc-shaped member secured to the inner wall for engaging and supporting one-half of a work piece, and means for engaging the other half of the work piece and for holding it in engagement with the first mentioned half, said arc-shaped member having extensions adapted to centralize the second mentioned half of the work piece with respect to the first mentioned half.

5. A chuck comprising a hollow rotary member, and means for supporting a work piece, said means comprising a pivoted adjustable clamping member adjustable lengthwise of said member and having a work engaging portion within said member and clamping means engaging the clamping member.

6. A chuck comprising a hollow rotary member having a pivoted clamping member having a support adjustable radially inwardly and outwardly to adapt it for work pieces of different diameters.

7. A chuck comprising a rotary member having a pivoted clamping member having a support adjustable longitudinally and radially of the rotary member.

8. In a chuck, a hollow rotary chuck body adapted to be supported at one end by a spindle and having an inner cylindrical bore, a pair of separate work supporting rails secured to the body in normally fixed position and projecting inwardly beyond the inner cylindrical bore, and means for clamping the work to said rails.

9. A chuck comprising a rotary chuck body adapted to be secured at one end to a spindle and having an inner cylindrical bore with a pair of grooves extending longitudinally of the bore, separate and independent work supporting rails secured in said grooves and projecting inwardly beyond the cylindrical bore, and means for clamping the work to the said rails.

10. A chuck comprising a rotary member having an inner bore with a pair of rails projecting inwardly beyond the inner surface and adapted to support one-half of a work piece, and having on the inner cylindrical bore an arc-shaped cradle for supporting the other half of the work piece.

11. In a chuck, a rotary chuck body having an inner cylindrical bore, a pair of oppositely disposed work supporting rails projecting inwardly of the cylindrical bore, and an arc-shaped work supporting cradle secured to the inner cylindrical surface and adjustable longitudinally of the chuck body.

In testimony whereof, I hereunto affix my signature.

HUMPHREY R. WARD.